Feb. 25, 1930.  J. T. RAMSDEN  1,748,729
LOCKING MEANS FOR SWING YOKES FOR MOLDING MACHINES
Filed April 5, 1929   2 Sheets-Sheet 1

INVENTOR
John T. Ramsden
BY
Augustus B. Stoughton
ATTORNEY.

WITNESS:

Patented Feb. 25, 1930

1,748,729

UNITED STATES PATENT OFFICE

JOHN T. RAMSDEN, OF PHILADELPHIA, PENNSYLVANIA, ASSIGNOR TO THE TABOR MANUFACTURING COMPANY, A CORPORATION OF PENNSYLVANIA

LOCKING MEANS FOR SWING YOKES FOR MOLDING MACHINES

Application filed April 5, 1929. Serial No. 352,790.

My invention relates to molding machines. The new feature is a pintle swung yoke that has a new device for locking the yoke in either of two positions, i. e., in line with the ramming head of the machine, or, again, in position when swung back clear of the ramming head of the machine.

The ease and speed with which an operator can handle this yoke has added very much to the speed of mold production because a slight pull on the handle swings the yoke from either of its positions and the energy of the weight in the yoke serves to automatically compress the spring and this effort also retards the movement of the yoke and it comes to rest and is automatically locked in either of its terminal positions.

Figure 1:
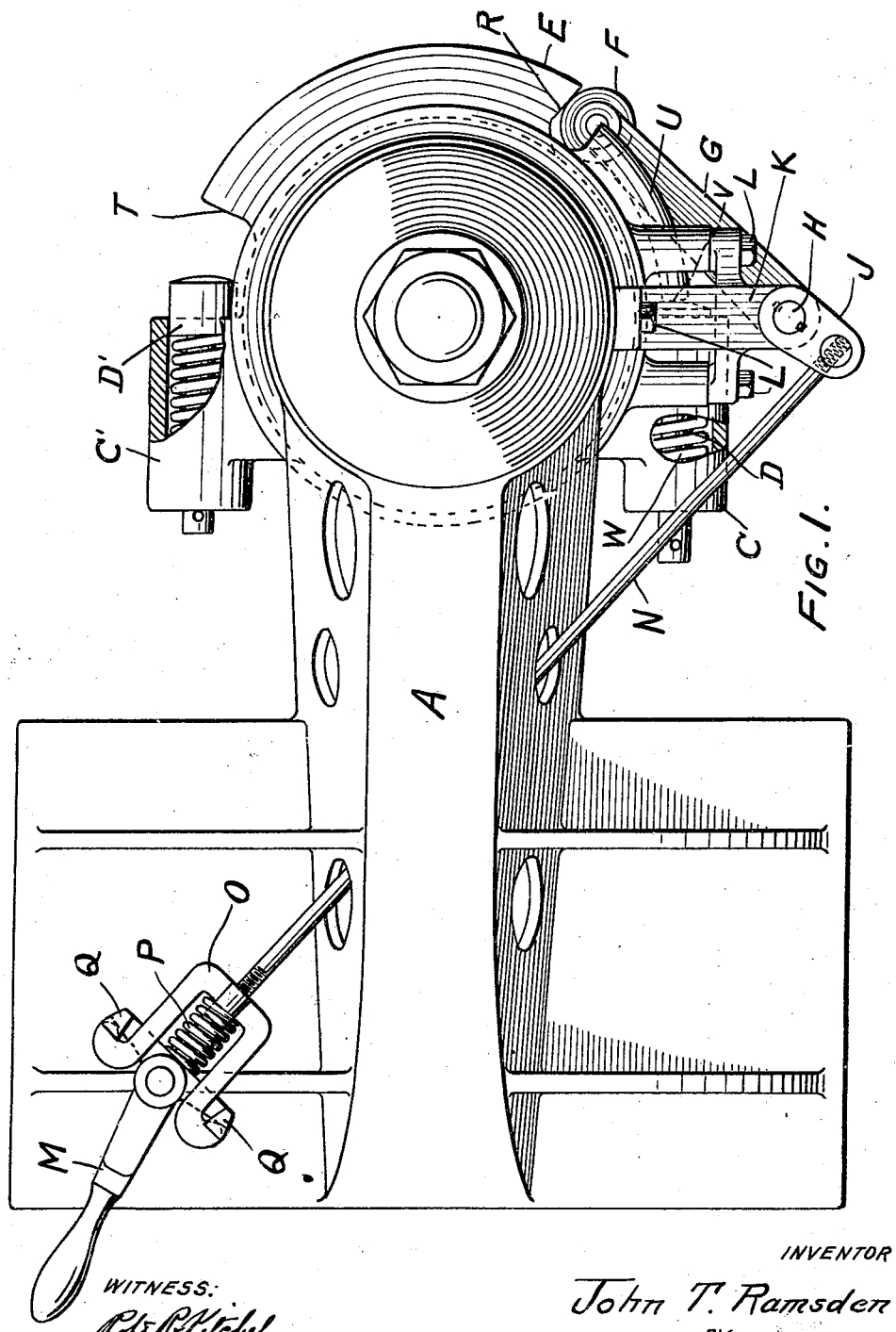
Figure 1 is a plan view with parts broken away.
Figure 2:
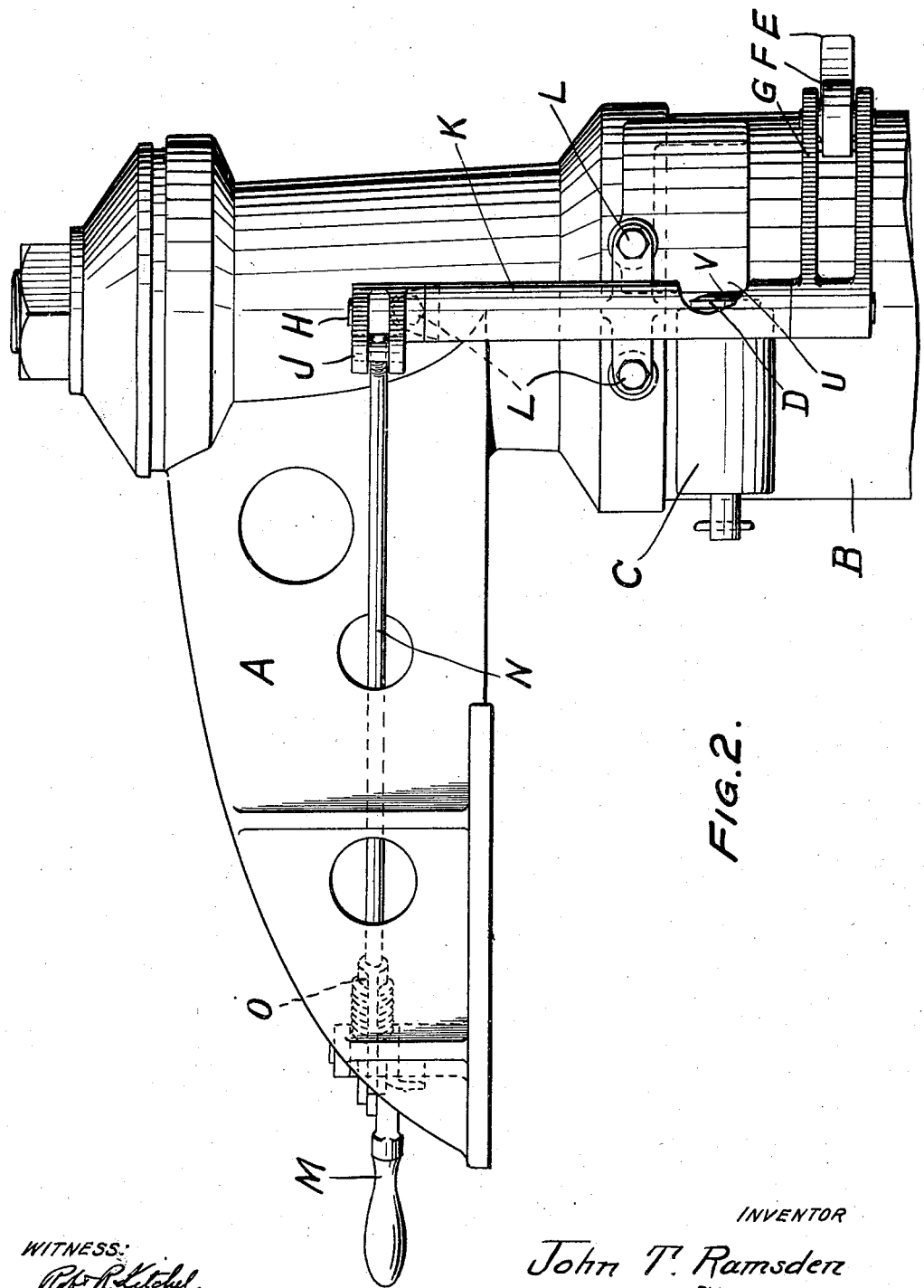
Figure 2 is a side elevation of the device with parts broken away.

The drawings show the detailed arrangement of the device in which A is the yoke, B, the supporting column upon which the yoke swings; C—C', lugs on the column in which are buffer spring plungers D—D'. E is a part of column B and forms a runway and stop for roller F carried in the lever G which is keyed to the rock shaft H to which is also keyed the lever J.

The shaft H rotates in the bracket K which is secured to the yoke A by bolts L. The lever J is coupled to a hand lever M by means of the connecting rod N and the rod end O.

The design of the rod end O and lever M is such that the rod N pulls out roller F no matter which way you move the lever M. A spring P under compression tends to hold the two ends of O in contact with the lugs Q—Q on the lever M and always brings the lever M back to a central position where roller F is engaged as shown with projections E. When the yoke is forward the roller F is in contact with E, the face R being at right angles to the center line of lever G, and when swung back the roller F is engaged at T with lug E. When in the position shown, the projection U is in contact with the plunger D as shown at V. When the lever M is pulled in either direction it compresses the spring P and, through the connection N, swings the roller F out free of runway E. In the position shown on the drawing, the spring W (which surrounds plunger D) is held under compression by the lug U in contact at V with plunger D.

The plunger D is movable in its bearings in the stationary column B, and, when the roller F is pulled free of the runway stops E, the recoil from the spring W exerts a pressure against the stop U on the yoke A and starts the rotating movement of the yoke A about its bearing on the supporting column B.

This yoke is entirely supported and rotates on cone roller bearings and when properly adjusted there is practically no friction to resist the movement of the yoke, consequently, the effort of the spring easily starts the yoke on its rotation and a slight additional pull by the operator on the lever M accelerates the spring effort and overcomes the inertia of the swinging yoke just enough so that when the yoke is swung back the lug U contacts with plunger D' and causes it to overcome the initial pressure of the spring under D' and compress it far enough to permit the roller F to engage with the stop E at T.

This operation is reversed for the return movement to the yoke.

There is no claim broadly to this type of swing yoke mounted on a pintle column.

I claim:

1. A column, a swing yoke pivoted thereon, locking means on the column, a roller mounted on the yoke to cooperate with the locking means, and a handle for controlling the roller.

2. A column, a swing yoke pivoted thereon, locking means on the column, a roller mounted on the yoke to cooperate with the locking means, a handle for controlling the roller. spring pressed plungers mounted on the column, and a rib on the yoke adapted to press against the plungers in either extreme position of the yoke.

3. A column, a swing yoke pivoted thereon, locking means on the column, a roller mounted on the yoke to cooperate with the locking means, a handle for controlling the roller, a spring connection between the handle and the roller, spring pressed plungers mounted on the column, and a rib on the yoke adapted to press against the plungers in either extreme position of the yoke.

4. A column, a swing yoke pivoted thereon, locking means on the column, a roller mounted on the yoke to cooperate with the locking means, a handle for controlling the roller, a spring connection between the handle and the roller, spring pressed plungers mounted on the column, a rib on the yoke adapted to press against the plungers in either extreme position of the yoke, and friction reducing bearings between the yoke and the column.

JOHN T. RAMSDEN.